June 15, 1926.
E. R. VIVES
VALVE
Filed Dec. 4, 1924
1,588,562
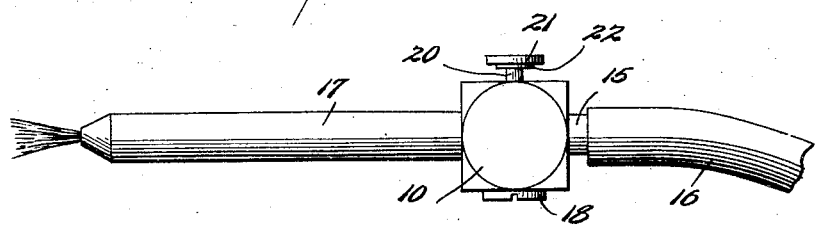
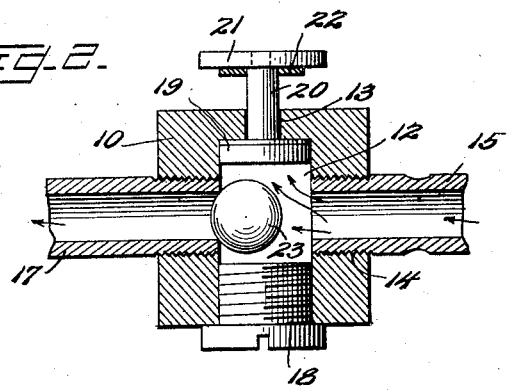
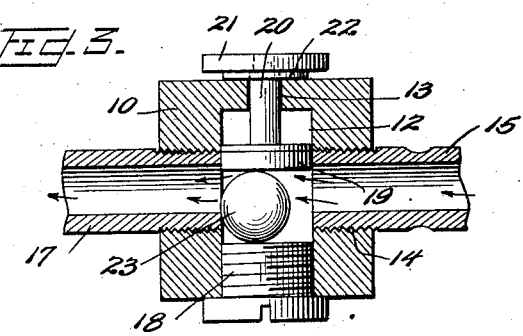
Inventor
Edward R. Vives
By Edward C. Sarnett
Attorney Patented June 15, 1926.

1,588,562

UNITED STATES PATENT OFFICE.

EDWARD R. VIVES, OF NEW YORK, N. Y.

VALVE.

Application filed December 4, 1924. Serial No. 753,897.

The present invention relates to valves and particularly to manually controlled ball valves.

The object of the invention is to produce a manually controlled ball valve that is particularly adapted for use with an oil spraying apparatus such as shown and described in my copending application, No. 658,653, filed Aug. 21, 1923. The apparatus referred to was designed by me as an automobile accessory for the purpose of spraying the working parts with lubricant. It comprises a small reservoir containing a supply of oil having flexible connections to a source of fluid pressure, on the one hand, and to a nozzle, on the other hand, whereby oil is forced from the reservoir under pressure, atomized, and projected at rather high velocity in the form of a spray which can be directed by the operator to any working part of the machine. It is desirable to provide a valve in connection with the nozzle of this apparatus which can be opened by simple pressure of the hand which holds the nozzle and which will surely and instantly close when the pressure is released, so that the oil spray may be at all times under perfect control by the operator and can be projected and instantly cut off in whatever position he may be. The valve should provide a straight unimpeded flow for the atomized oil, should have a minimum number of parts of simple and rugged form adapted to be manufactured at small cost, should be capable of easy disassembly for inspection and cleaning and should be thoroughly reliable in operation. The present invention provides a valve construction which has these desirable features and meets these conditions and requirements in a very satisfactory manner.

Referring to the accompanying drawings for a particular description of a construction embodying the invention:—

Fig. 1 is a side view of a valve housing and a hose and nozzle connected therewith;

Fig. 2 is a central vertical section through the housing showing the valve seated; and Fig. 3 is a similar view showing the valve unseated.

In the form shown by the drawings, the valve housing consists of a square metal block 10 having chamfered corners. A hole or bore 12 is formed in the block on an axis coincident with the vertical axis of the block and opens at the lower side of the block but extends short of the upper side, where it communicates with a small coaxial bore 13 which opens at the upper side of the block. The block is also formed with a horizontal bore 14 which has its axis intersecting the axis of the vertical bore 12 at a right angle. Bore 14 is threaded and receives at one side of the block a nipple 15 which is adapted to be connected to a flexible hose 16 leading to a supply of lubricant under pressure, and receives at the other side of the block the threaded end of a nozzle 17. The lower portion of bore 12 is threaded and receives a screw plug 18. A plunger 19 is mounted in the upper smooth part of bore 12, having a nice but not a tight fit therein. The plunger is provided with a stem 20 which projects through the small bore 13 and has a reduced end on which is secured a button 21. A washer 22 is carried on stem 20 at the under side of the button. A ball 23 in the valve chamber thus formed is adapted to seat on the end of nozzle 17 screwed in block 10, as shown in Fig. 2, and is adapted to be unseated by depression of plunger 19, as shown in Fig. 3.

Normally, that is when the apparatus is not working and lubricant under pressure is not supplied to the valve chamber, the parts may be in the position shown by Fig. 3, and will be in such position if the housing is resting in the position shown. Now when fluid pressure is applied the pressure in the valve chamber will instantly force plunger 19 up and simultaneously move the ball 23 over the orifice of the nozzle, the positions assumed being shown in Fig. 2. The operator now grasping the nozzle in one hand may project the lubricant spray at will simply by depressing the button 21 with the thumb, finger or other part of the same hand, moving the ball transversely with respect to the orifice to the position shown in Fig. 3. In this position the washer 22 prevents escape of lubricant around stem 20. In the position of Fig. 2 escape of lubricant is prevented by the close engagement of the upper face of the plunger with the surface surrounding bore 13.

It will be seen therefore that the valve construction produced by the present invention provides for a straight flow of lubricant therethrough, has a minimum number of parts of simple rugged construction which will wear indefinitely without getting out of order and which can be produced at a low cost, and has provisions for quick and easy disassembly. It will be noted that the ball is freely movable to closing position when pressure is applied, as the plunger responds instantly to the pressure and does not interfere with the movement of the ball.

Having described a specific construction embodying the invention, what I claim as new and desire to secure by Letters Patent of the United States is:—

1. A valve comprising a chambered block having opposed inlet and outlet ports, a ball in the chamber of said block adapted to cover the outlet port, and a plunger in said chamber having a stem projecting on the outside of the block adapted to engage the ball and move it transversely from said outlet port, said plunger being manually movable against fluid pressure in the chamber.

2. A valve comprising in combination, a chambered block having coaxial inlet and outlet ports, a ball in the chamber of said block adapted to seat on the outlet port when pressure is applied to the chamber, a plunger in said chamber movable transversely to the axis of said ports and having a stem projecting on the outside of the housing for manual operation to unseat the valve, said plunger tending to move away from the ball under the action of fluid pressure in the housing.

3. A valve comprising in combination, a block formed with a bore opening at one side thereof and with a smaller coaxial bore opening at the other side and communicating with the first bore, a removable plug in the open end of the first bore, a plunger in the first bore having a stem projecting through the smaller bore and provided with a button, a ball in the first bore between the plug and plunger, said block being also formed with a bore intersecting said first bore and having secured therein conduits, said ball being adapted to seat on the orifice of one of said conduits.

4. A valve comprising in combination, a block formed with a bore opening at one side thereof and with a smaller coaxial bore opening at the other side and communicating with the first bore, a removable plug in the open end of the first bore, a plunger in the first bore having a stem projecting through the smaller bore and carrying on its end a disk, a washer on said stem, a ball in the first bore between the plug and plunger, said block being also formed with a bore on an axis intersecting the axis of the first bore at a right angle and adapted to receive therein conduits, said ball being adapted to seat on the orifice of one of said conduits.

In testimony whereof I hereunto affix my signature.

EDWARD R. VIVES.